Oct. 18, 1960   G. VOICH ET AL   2,956,810
CINDER SPREADERS

Filed March 28, 1958   2 Sheets-Sheet 1

INVENTOR.
George Voich
and John Voich
BY William B. Jaspert
Attorney.

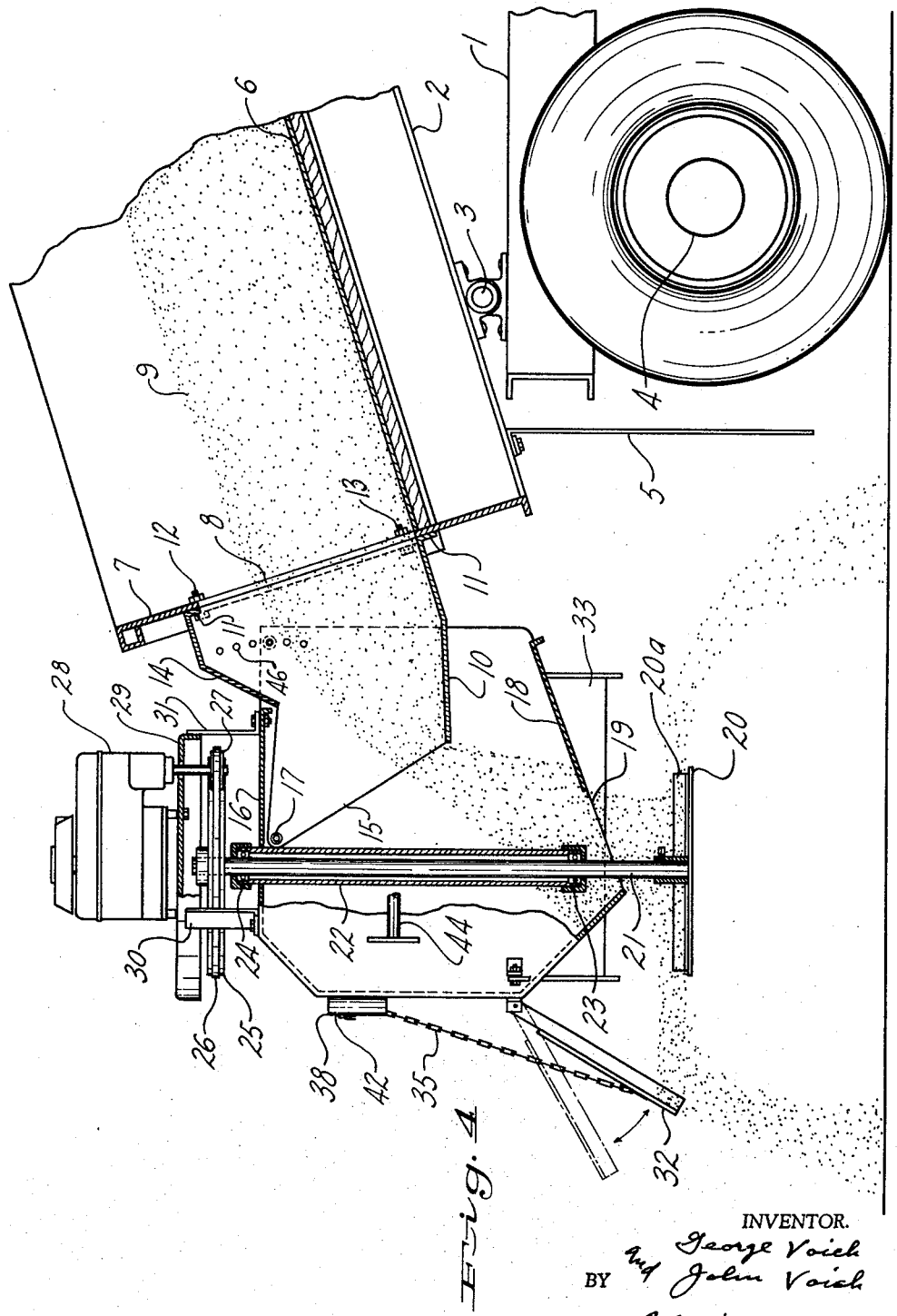

United States Patent Office 2,956,810
Patented Oct. 18, 1960

2,956,810

CINDER SPREADERS

George Voich and John Voich, both of P.O. Box 247, Irwin, Pa.

Filed Mar. 28, 1958, Ser. No. 724,711

4 Claims. (Cl. 275—8)

This invention relates to new and useful improvements in apparatus for spreading cinders on slippery highways and the like, and it is among the objects of the invention to provide a cinder spreader which consists of a cinder box, a spreader wheel and a cinder chute which are attached to and suspended from the tailgate of a cinder hauling truck.

It is a further object of the invention to provide a cinder spreader in which the spreader wheel is disposed below an opening in the cinder box and is operated by a motor on a plate mounted above the cinder box and in which the motor and spreader wheel are maintained in a normal horizontal position regardless of the tilt or angle of inclination of the cinder truck or chute.

It is still a further object of the invention to provide a cinder spreader attachment for use in a truck in which the spreader wheel is disposed a sufficient distance away from the cinder truck to provide for a substantial radial spread of the cinders and in which the direction and distance of spreading is controlled by adjustable pans disposed in the path of the cinders being thrown by the spreader wheel.

These and other objects of the invention will become more apparent from a consideration of the accompanying drawings constituting a part hereof in which like reference characters designate like parts and in which—

Figure 4 is a vertical section, partially in elevation, taken on the longitudinal center line of the cinder spreader and a portion of the cinder truck.

Figure 1:
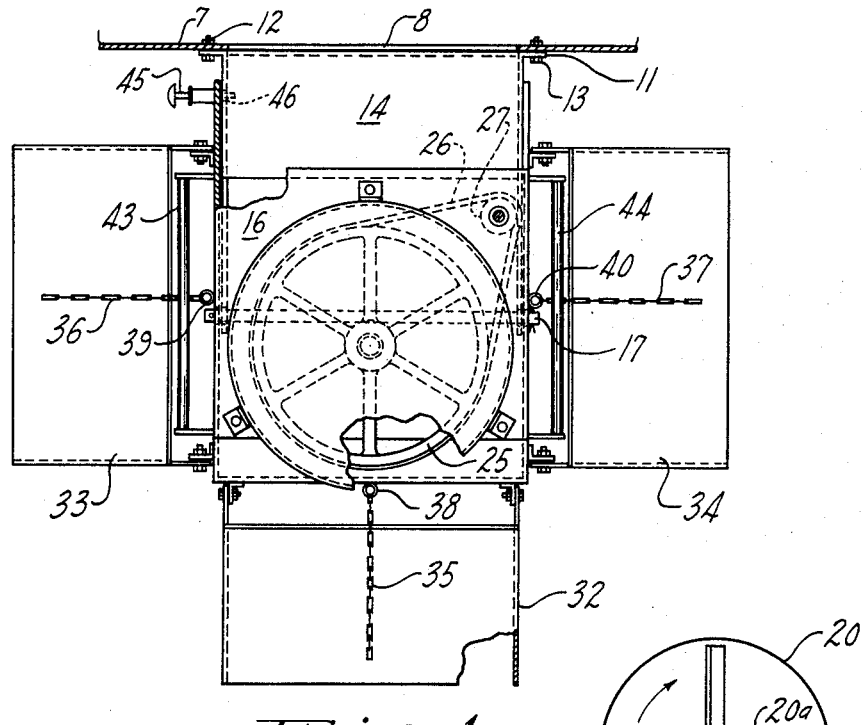
Figure 1 is a top plan view of a cinder spreader attached to a cinder truck embodying the principles of this invention.
Figure 3:
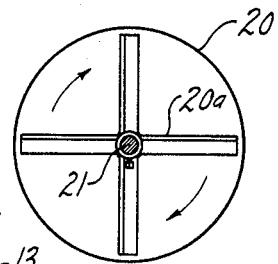
Figure 3 is a top plan view of the spreader wheel taken on the line 3—3, Figure 2.

With reference to the several figures of the drawing, the numeral 1 designates the chassis of a truck having a dump body 2 hinged at 3, the truck being mounted on the usual wheel axles 4 and provided with the usual splash guards 5, all as shown in Figure 4.

The bed of the cinder truck is designated by the numeral 6 and the tailgate by the numeral 7. As shown in Figure 4, the tailgate is provided with a cutout portion or window 8 which allows the cinders designated by the numeral 9 to slip into a chute 10. The chute is provided with flanges 11 which are attached to the tailgate 7 by bolts 12 and 13. The top of the chute is provided with a hood 14 and with extending ears 15 to which a cinder box generally designated by the numeral 16 is attached by means of a pivot bar or rod 17 which is more clearly shown in Figure 1 of the drawings.

The cinder box 16 has a slanting bottom 18 into which the cinders 5 drop from the chute 10. The bottom 18 of the cinder box has an opening 19 from which the cinders drop onto a spreader wheel 20 that is mounted on a shaft 21 extending through a shaft housing 22 in which it is journaled by ball bearings 23 and 24. The top of shaft 21 is provided with a sheave wheel 25 driven by a belt 26 that passes over a pulley 27 driven by the motor 28. This motor is mounted on a pulley cover 29. Cover 29 is secured to the cinder box by brackets 30 and 31 as shown. The spreader wheel 20 is provided with angle bars 20a for engaging the cinders and spread them by centrifugal force.

Figure 2:
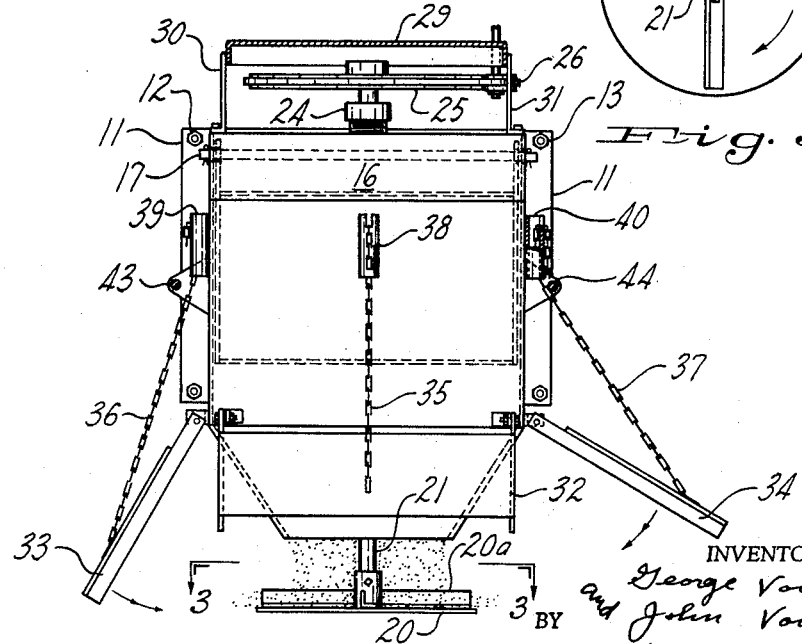
Figure 2 is a rear elevational view thereof.

The cinder box 16 is provided with what may be termed pans 32 at the rear thereof and pans 33 and 34 at the side thereof, as shown in Figure 2 of the drawings, and also in Figure 1. These pans are held by chains 35, 36 and 37 that are anchored in chain supports 38, 39 and 40, the chain supports having catches for locking the chain in any set position, as shown at 42 in Figure 4.

The position of the pans determines the degree of spreading caused by the centrifugal force from the cinders imparted by the spreader wheel angle bars 20a. Also, if a cindering crew is spreading a roadway on which vehicles are parked on one side, the pan on that side of the spreader may be dropped so that the spreading of the cinders is confined to the width of the spreader box on the particular side in question, while they may be given a normal spreading range on the open side of the roadway.

As is shown in Figures 1 and 2, handles 43 and 44 are provided on the sides of the cinder box for the convenience of the crew in supporting themselves on slippery roads while adjusting the spreader pan chains.

As shown in Figure 1, the cinder box 16 is maintained level by a spring loaded pin 45 which is inserted in one of a series of angularly spaced openings 46 in the side wall of chute 10, Figure 4, to hold the cinder box in a level or horizontal position relative to the angularity of the cinder chute and truck body, which of course may be tilted more or less, depending upon the volume of cinders contained within the truck and the density of the spread. The latter may also be controlled by the speed of rotation of the spreader wheel 20.

By attaching the cinder box and spreader to a chute which in turn is fastened to the tailgate of the truck, it does not require any wheel axle supports as is common in most types of cinder spreaders, and a large volume of cinders may be spread in a minimum of time by attaching the spreader to a truck of large hauling capacity. By means of the construction shown with the separate motor drive above the cinder box and with the motor maintained at a substantially level position, the spreader wheel is operated with a minimum of effort as it is always clear of cinders and is loaded only by the volume of the cinders falling through the opening 19 at the bottom of the box. By means of the adjustable chains of the spreader pans 32, 33 and 34, the amount of spreading can be conveniently regulated and adjustments promptly made even while the vehicle is in operation. Also, it is apparent that the combination of the chute portion with the tailgate of the hauling truck to which it is rigidly secured and the tilted or pivoted suspension of the cinder box, a simple and efficient spreading unit is available for attachment to any type of cinder hauling truck body.

Although one embodiment of the invention has been herein illustrated and described, it will be evident to those skilled in the art that various modifications may be made in the details of construction without departing from the principles herein set forth.

I claim:

1. In combination with a truck body having a window in the tailgate thereof of a chute co-extensive with the area of the window attached to the rear end of said truck tailgate and forming an extension thereof, a cinder box having an open side for receiving the body of the body of the chute, said box having a feed opening at the bottom in alignment with the end of the chute and a spreader wheel below said feeding opening in the path of the cinders delivered by said chute, said box being pivoted to said chute at the top to suspend the box in a relatively road level position and means for locking said box to said chute.

2. A cinder spreader as set forth in claim 1 in which the chute has a hooded portion terminating at an open top portion that is normally closed by the overlapping top of the cinder box.

3. A cinder spreader as set forth in claim 1 in which the spreader wheel is attached to a shaft journaled in a sleeve extending through the cinder box and a drive motor mounted on top of the cinder box.

4. A cinder spreader as set forth in claim 1 in which the cinder box is provided with inclined bottom walls to form a hopper-like container having a feed opening and hinged pans substantially co-extensive with the side walls with adjustable means for varying the angularity of the pans to control the spreading action of the spreader wheel.

References Cited in the file of this patent

UNITED STATES PATENTS

| | | |
|---|---|---|
| 1,220,945 | Brown | Mar. 27, 1917 |
| 2,003,628 | Chadwick | June 4, 1935 |
| 2,317,853 | Gaddis | Apr. 27, 1943 |
| 2,327,266 | Hoffstetter | Aug. 17, 1943 |
| 2,487,552 | Humphrey | Nov. 8, 1949 |
| 2,500,682 | Hoffstetter | Mar. 14, 1950 |
| 2,856,191 | Kolb | Oct. 14, 1958 |

FOREIGN PATENTS

| | | |
|---|---|---|
| 948,289 | France | Jan. 24, 1949 |